H. K. WHITNER.
EXPANSION BOLT.
APPLICATION FILED SEPT. 4, 1906.
921,037.
Patented May 11, 1909.
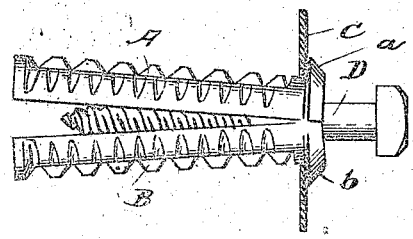
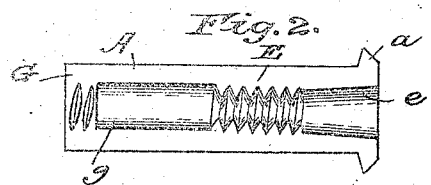
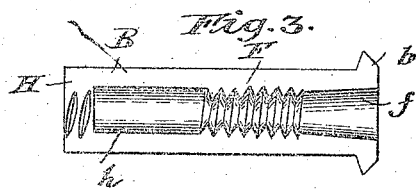
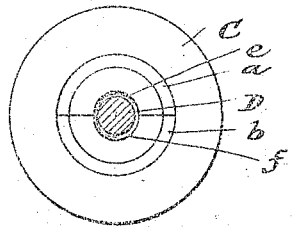
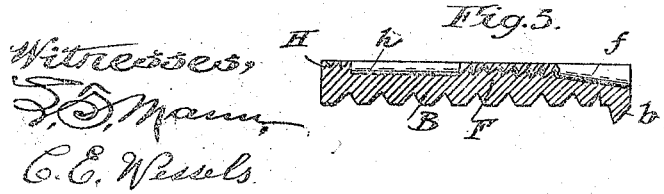
Witnesses:
S. S. Mann
C. E. Wessels
Inventor,
Hiram K. Whitner

UNITED STATES PATENT OFFICE.

HIRAM K. WHITNER, OF CHICAGO, ILLINOIS.

EXPANSION-BOLT.

No. 921,037.     Specification of Letters Patent.     Patented May 11, 1909.

Application filed September 4, 1906. Serial No. 333,085.

*To all whom it may concern:*

Be it known that I, HIRAM K. WHITNER, a citizen of the United States, residing at Chicago, in the county of Cook and State of Illinois, have invented certain new and useful Improvements in Expansion-Bolts; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to so called expansion bolts.

The object of my invention is to hold a bolt (lag screw) in a relative position in the masonry of walls in buildings, etc.

In Patent No. 519,365, issued to your petitioner May 8th, 1894, and in Re-issues Nos. 12,145 and 12,146, August 11, 1903, I show a lag screw installed in wooden window frames of buildings, said lag screw being the permanent fixture to a window-cleaner's safety device. It will be noted therein, and as hereinafter shown, that a portion of the unthreaded shank next the head of said lag screw is made to protrude in said installation, whereby said installation is adapted to engage with a slotted plate, the terminal to a portable window-cleaner's belt. Inasmuch as I do not limit myself to said uses in the arts, I omit the details of said terminals herein.

My invention consists in the construction and arrangement of parts in a new and novel manner and for the purposes hereinafter set forth.

Figure 1 shows the various members of my invention assembled integrally. Fig. 2 shows one of said members. Fig. 3 shows another member differing from Fig. 2, in so much as the two sections of a longitudinally divided nut would differ, said Fig. 3 is shown longitudinally sectioned in Fig. 5, wherein a conated formation is more clearly illustrated. Fig. 4 shows an end view of the assembled members as they appear upon the outside face of a wall, showing the bolt cross sectioned in the shank at the mouth of the passage for said bolt.

In Fig. 1, A is a so called half shell, B being another half shell opposed to said shell A, said shells A and B having serrated peripheries whereby a bite may be had upon the walls of a boring in the masonry hereinafter referred to as a wedge reversed housing; *a* is a flange to half shell A, *b* is a flange to half shell B.

C is an annular disk, or washer, adapted to hold the said assembled parts, as a unit, during the operation of said installation, and furthermore will hold the flanges *a* and *b* snugly about the shank of said bolt, leaving the free extremes of said shells to assume the form of a dovetail spread within the wedge reversed housing in the masonry of a building.

In Figs. 2 and 3 is seen the concavity of said half shells A and B, E and F being the female threads of a nut; G and H are a trace of said female threading, being the apex of said conated bolt passage, a threaded formation not being essential at this point as hereinafter shown and described; *g* and *h* are channels formed by the omission of the threaded formation at those points; *e* and *f* are conated channels, the base of said cone being at the entrance to said bolt passage in said assembled members, said conation extends in parallel through the female threaded sections E and F.

As shown in Fig. 4, the function of annular disk C is to embrace half shells A and B; the flanges *a* and *b* are to retain annular disk C in position outside of said wall and snug against the masonry, and furthermore to cover, to hide, any imperfections in the orifice made in said wall preparatory to said installation. Inasmuch as I may omit said disk C when the said drilling leaves a snug orifice in such an event an annular ring, a modification of disk C, would be used in place of said disk C.

As shown in Fig. 1, the function of A and B is to occupy the drilled housing wholly, while the said disk C, or its equivalent, and flanges *a* and *b*, together with a section of the lag screw designated D, are wholly exterior to said housing in said masonry. Said process of expansion is as follows: Half shells A and B, in the form of a split nut or tube, are passed into annular disk C or its equivalent, and also into the cavity or drilled excavation; the threaded gimlet shape point of said lag screw is now introduced into the channel formation *e* and *f*, engagement is effected between the conated male threads of the lag screw and the conated female threads E and F, whereby the expansion advances as the lag screw is driven home. After the threads of said lag screw reach the channel

*g, h,* the opposing flanges no longer are rigidly in contact, hence the free ends of the shells may yield to the expansion force of the intruding lag screw. In an extensive reduction to practice, many lag screws have been twisted off and broken, where said provision for yielding was not provided. In the event of the housing being of such a nature that no yielding of said installation is permissible, a longer lag screw should be used in order that said longer screw may contact with the members G and H, making a rigid contact between the inner ends of said members also.

As shown in Fig. 4, space *e, f*, has a clearance between the concavity of said half shells A and B, and the cross sectioned lag screw, the shaded member; the purpose of said clearance is to not have the channels *a* and *b* contact with the shank D of the lag screw during the tilting process of shells A and B, while making the installation such contact at the head end extreme would disengage the registering of the opposing threaded members herein described. I may use a soft cement or mortar mixture in said housings which necessarily must be in the form of a reversed wedge in order to effect the dovetail installation herein contemplated, such filling of the interstices will afford additional stability in situations such as blocks of terra cotta, the latter usually in the arts consisting of thin walls with hollow interior spaces.

Having thus described my invention, I will now point out in claims what is new and novel and what I wish to secure by Letters Patent of the United States.

1. In an expansion bolt device, two half shells adapted to be assembled in a wedge reversed housing, said respective half shells being provided with a flange at its head end extreme and a concavity having a greater diameter at said head end extreme and a lesser diameter at the free end extreme, said greater concavity being of a conated channel formation having its base at the said head end extreme, a conated nut formation intermediate in the surface of said concavity, said nut formation being provided with female threads, said threads being raised above the surface of said channeling and being adapted to register with the threads of an installed lag screw.

2. In an expansion bolt device, two half shells adapted to be assembled in a wedge reversed housing, said respective half shells being provided with a disk retaining flange at its head end extreme, and a concavity having a greater diameter at said head end extreme and a lesser diameter at the free end extreme, said greater concavity being of a conated channel formation having its base at the said head end extreme, a conated nut formation intermediate in the surface of said concavity, said nut formation being provided with female threads, said threads being raised above the surface of said channeling and adapted to register with the threads of an installed lag screw, a disk adapted to hold said conated concavity about the shank of said lag screw.

HIRAM K. WHITNER.

Witnesses:
HATTIE B. LEHMAN,
ANNA A. MOLONEY.